United States Patent [19]

Kioka et al.

[11] Patent Number: 4,952,649
[45] Date of Patent: Aug. 28, 1990

[54] PROCESS FOR PRODUCING OLEFIN POLYMERS OR COPOLYMERS AND CATALYST COMPONENTS USED THEREFOR

[75] Inventors: Mamoru Kioka, Ohtake; Norio Kashiwa, Iwakuni, both of Japan

[73] Assignee: Mitsui Petrochemical Industries, Ltd., Tokyo, Japan

[21] Appl. No.: 169,171

[22] Filed: Mar. 11, 1988

Related U.S. Application Data

[63] Continuation of Ser. No. 729,903, May 3, 1985, abandoned, which is a continuation of Ser. No. 604,421, Apr. 30, 1984, abandoned, which is a continuation of Ser. No. 428,140, Sep. 29, 1982, abandoned.

[30] Foreign Application Priority Data

Nov. 13, 1981 [JP] Japan .................. 56-181019

[51] Int. Cl.$^5$ .......... C08F 4/654; C08F 10/00
[52] U.S. Cl. .................. 526/125; 502/119; 502/125; 502/126; 502/127; 526/122; 526/124; 526/348; 526/348.4; 526/348.6; 526/351; 526/352; 526/904; 526/909
[58] Field of Search .......... 526/124, 125, 142, 122; 502/119, 125, 126, 127

[56] References Cited

U.S. PATENT DOCUMENTS

| | | | |
|---|---|---|---|
| 4,330,649 | 5/1982 | Kioka et al. | 526/124 |
| 4,336,360 | 6/1982 | Giannini et al. | 526/125 |

FOREIGN PATENT DOCUMENTS

| | | | |
|---|---|---|---|
| 0045977 | 2/1982 | European Pat. Off. | 526/125 |
| 94590 | 7/1979 | Japan . | |
| 36203 | 3/1980 | Japan . | |
| 2040967 | 9/1980 | United Kingdom | 526/125 |

*Primary Examiner*—Edward J. Smith
*Attorney, Agent, or Firm*—Sherman and Shalloway

[57] ABSTRACT

A solid titanium catalyst component (A) of a catalyst system useful in the polymerization of olefins or copolymerization of two or more olefins or one or more olefins and a diene is prepared by contacting a liquid hydrocarbon solution of (i) a magnesium compound, such as magnesium chloride, with (ii) a liquid titanium compound, such as TiCl$_4$, or a solution of a titanium compound in a hydrocarbon solvent, to form a solid product. The solid product is formed in the presence of (D) an electron donor, e.g. methyl formate, acetic acid, acetic anhydride, acetone, methyl ether, butyl Cellosolve, dimethyl carbonate, methyl silicate. The solid product is also contacted with a polycarboxylic acid ester, e.g. diethyl methylsuccinate. The polymerization or copolymerization of the olefin is carried out in the presence of the solid titanium catalyst (A) and (B) an organometallic compound of a Group I to III metal and (C) an organic silicon compound having an Si—O—C bond. Granular or spherical polyethylene, polypropylene, poly(butene-1), poly(4-methylpentene-1), etc. are produced in high yield, with good flowability, high bulk density, and narrow particle size distribution. The polymers can be produced over a wide range of melt index values without reduction in stereospecificity. Catalyst activity is retained with passage of time.

18 Claims, No Drawings

PROCESS FOR PRODUCING OLEFIN POLYMERS OR COPOLYMERS AND CATALYST COMPONENTS USED THEREFOR

This application is a continuation, of application Ser. No. 729,903 filed 5/3/85, which in turn is a CONT of U.S. Ser. No. 604,421 filed 4/30/84 which in turn is a CONT of U.S. Ser. No. 428,140 filed 9/29/82, all now abandoned.

This invention relates to a process for producing olefin polymers (sometimes used to denote both homopolymers and copolymers of olefins) by the polymerization (sometimes used to denote both homopolymerization and copolymerization) of olefins. Particularly, it relates to a process for producing olefins polymers of high stereospecificity in large quantities by the polymerization of alpha-olefins having at least 3 carbon atoms.

In the polymerization of alpha-olefins having at least 3 carbon atoms according to the process of the invention, the resulting polymer shows little or no reduction in stereospecificity even when the melt index of the polymer is changed by using a molecular weight controlling agent such as hydrogen. Furthermore, when the process of this invention is carried out by the slurry polymerization method or vapor phase polymerization method, there can be obtained a granular or spherical polymer which has good flowability, a high bulk density, and a narrow particle size distribution with most of the particles having a moderate particle size. The process of this invention also has the advantage that the decrease of the activity of the catalyst is extremely little with the lapse of the polymerization time.

More specifically, this invention relates to a process for producing olefin polymers or copolymers which comprises polymerizing or copolymerizing olefins or copolymerizing olefins and dienes in the presence of a catalyst system composed of the following components (A), (B) and (C):

(A) a solid titanium catalyst component containing magnesium, titanium, halogen and an ester selected from the group consisting of esters of polycarboxylic acids and esters of polyhydroxy compounds, said catalyst component being obtained by contacting a liquid hydrocarbon solution of (i) a magnesium compound with (ii) a titanium compound in the liquid state to form a solid product or first preparing a liquid hydrocarbon solution of the magnesium compound (i) and the titanium compound (ii) and then forming a solid product therefrom, said reaction of forming the solid product being carried out in the presence of (D) at least one electron donor selected from the group consisting of monocarboxylic acid esters, aliphatic carboxylic acids, carboxylic acid anhydrides, ketones, aliphatic ethers, aliphatic carbonates, alkoxy group-containing alcohols, aryloxy group-containing alcohols, organic silicon compounds having an Si—O—C bond and organic phosphorus compounds having a P—O—C bond, and during or after the formation of the solid product, contacting the solid product with (E) an ester selected from the group consisting of esters of polycarboxylic acids and esters of polyhydroxy compounds, (B) an organometallic compound of a metal selected from the group consisting of metals of Groups I to III of the periodic table, and (C) an organic silicon compound having an Si—O—C bond or Si—N—C bond.

This invention also pertains to the aforesaid solid titanium catalyst component.

Numerous techniques have been proposed heretofore about the production of a solid catalyst component consisting essentially of magnesium, titanium, halogen and an electron donor, and it is known that the use of this solid catalyst component in the polymerization of alpha-olefins having at least 3 carbon atoms can give highly stereospecific polymers with high catalytic activity. Many of these prior techniques, however, are still desired to be improved in regard to the activity of the catalyst component and the stereospecificity of the polymer.

For example, in order to obtain an olefin polymer of high quality without the need to treat it after the polymerization, the proportion of a stereospecific polymer formed should be very high and the yield of the polymer per unit amount of the transition metal should be sufficiently high. From this viewpoint, the prior techniques may be on a fairly high level with certain types of polymer, but few are entirely satisfactory in regard to the residual halogen content of the polymer which causes the corrosion of molding machines. In addition, many of the catalyst components produced by the prior techniques have the defect of reducing yield and stereospecificity to not a small extent.

Japanese Laid-Open Patent Publication No. 94590/1979 (laid open on Jul. 26, 1979) discloses a process for polymerizing olefins using a catalyst system containing a compound which can overlap the component (C) of the catalyst system used in this invention. This patent document, however, fails to disclose the component (A) specified in the present application. Japanese Laid-Open Patent Publication No. 36203/1980 (laid-open on Mar. 13, 1980) also discloses a process for polymerizing olefins using a catalyst system containing a compound which can overlap the component (C) used in this invention, but fails to disclose the catalyst component (A).

Japanese Laid-Open Patent Publication No. 811/1981 laid open on Jan. 7, 1981 (corresponding to U.S. Pat. No. 4,330,649) of which inventorship includes the present inventors discloses a process for the production of olefin polymers or copolymers having good flowability, a uniform particle size and a uniform particle size distribution, which is especially suitable for the polymerization of alpha-olefins having at least 3 carbon atoms. This patent is quite silent on the use of a polycarboxylic acid ester and/or an ester of a polyhydroxy compound as an electron donor in the formation of a solid titanium catalyst component. Furthermore, it fails to disclose anything about the combined use of such an ester and the aforesaid electron donor (D), and the combined use of these with the organic silicon compound (C).

The present inventors made extensive investigations in order to provide a further improved process for polymerizing olefins. These investigations have led to the discovery that by using a new type of catalyst system composed of the titanium catalyst component (A) prepared by using both the electron donor (D) and the ester (E) selected from esters of polycarboxylic acids and esters of polyhydroxy compounds, and the aforesaid components (B) and (C), polymers having excellent quality in respect of particle size, particle size distribution, particle shape and bulk density can be obtained with high catalytic performance and a very little decrease in activity with the passage of the polymerization time. It has also been found that the process of this invention reduces the prior art's defect that an attempt to obtain a polymer of a high melt index by performing the polymerization in the presence of a molecular weight controlling agent such as hydrogen results in not a small reduction in stereospecificity. It has further been found that the use of a small amount of hydrogen makes it possible to adjust the melt index of the polymer. The present invention also brings about the unexpected advantage that by the use of a molecular weight controlling agent such as hydrogen, the activity of the catalyst rather increases.

It is an object of this invention therefore to provide an improved process for polymerizing olefins.

The above and other objects and advantages of this invention will become more apparent from the following description.

The magnesium compound (i) used in the preparation of the solid titanium catalyst component (A) in this invention is preferably a magnesium compound having no reducing ability, i.e. a magnesium compound free from a magnesium-carbon bond or magnesium-hydrogen bond. Such a magnesium compound may be derived from a magnesium compound having reducing ability.

Illustrative of the magnesium compound having no reducing ability are magnesium halides such as magnesium chloride, magnesium bromide, magnesium iodide and magnesium fluoride; alkoxy magnesium halides, for example $C_1$–$C_{10}$ alkoxy magnesium halides such as methoxy magnesium chloride, ethoxy magnesium chloride, isopropoxy magnesium chloride, butoxy magnesium chloride and octoxy magnesium chloride; aryloxy magnesium halides, for example phenoxy magnesium halides which may optionally be substituted by lower alkyl groups, such as phenoxy magnesium chloride and methylphenoxy magnesium chloride; alkoxy magnesiums, for example $C_1$–$C_{10}$ alkoxy magnesiums such as ethoxy magnesium, isopropoxy magnesium, butoxy magnesium, n-octoxy magnesium and 2-ethylhexoxy magnesium; aryloxy magnesiums, for example phenoxy magnesiums which may optionally be substituted by lower alkyl groups; and magnesium salts of carboxylic acids, for example magnesium salts of aliphatic carboxylic acids having 1 to 20 carbon atoms, such as magnesium laurate and magnesium stearate. The magnesium compounds may be in the form of complexes or mixtures with other metals. The halogen-containing magnesium compounds, above all magnesium chloride, alkoxy magnesium chlorides and aryloxy magnesium chlorides, are preferred among these magnesium compounds.

In preparing the liquid hydrocarbon solution of the magnesium compound (i), various hydrocarbon solvents can be used. Examples include aliphatic hydrocarbons such as pentane, hexane, heptane, octane, decane, dodecane, tetradecane and kerosene; alicyclic hydrocarbons such as cyclopentane, methylcyclopentane, cyclohexane, methylcyclohexane, cyclooctane and cyclohexene; aromatic hydrocarbons such as benzene, toluene, xylene, ethylbenzene, cumene and cymene; and halogenated hydrocarbons such as dichloroethane, dichloropropane, trichloroethylene, carbon tetrachloride and chlorobenzene.

The solution may be prepared by various methods chosen depending upon the types of the magnesium compound and the solvent, for example by simply mixing the two; mixing the two and heating the mixture; or mixing the magnesium compound with the hydrocarbon solvent in the presence of, or after being treated with, an electron donor capable of solubilizing the magnesium compound, such as an alcohol, an aldehyde, a carboxylic acid, an ether or a mixture thereof, or a mixture thereof with another electron donor, and as required, heating the mixture.

For example, in the case of dissolving a halogen-containing magnesium compound (i) in the hydrocarbon solvent with the aid of an alcohol, the alcohol may be used in an amount of at least about 1 mole, preferably at least about 1.5 mole, especially preferably more than 2 moles, per mole of the halogen-containing magnesium compound although the molar ratio of these may be varied properly depending upon the type and amount of the hydrocarbon solvent and the type of the magnesium compound. There is no particular upper limit to the amount of the alcohol, but economically, it is desirable not to use it in too large an amount. For example, the amount of the alcohol is up to about 40 moles, preferably up to about 20 moles, especially preferably up to about 10 moles, per mole of the magnesium compound (i). When an aliphatic or alicyclic hydrocarbon is used as the hydrocarbon solvent, alcohols are used in the above-mentioned proportion, and among them, alcohols having at least 6 carbon atoms are used in an amount of at least about 1 mole, preferably at least about 1.5 moles, per mole of the halogen-containing magnesium compound. This is preferred since the halogen-containing magnesium compound can be solubilized with the use of alcohols in a small total amount and a catalyst component having high activity can be prepared. If in this case only alcohols having not more than 5 carbon atoms are used, their amount should be at least about 15 moles per mole of the halogen-containing magnesium compound, and the resulting catalyst component has lower catalytic activity than that obtained as described above. On the other hand, when an aromatic hydrocarbon is used as the hydrocarbon solvent, the halogen-containing magnesium compound can be solubilized by using alcohols in the aforesaid amounts irrespective of the types of the alcohols. Furthermore, if, for example, a tetraalkoxy titanium is caused to be present together as the titanium compound (ii) in solubilizing the halogen-containing magnesium compound, the use of a small amount of alcohols makes it possible to solubilize the halogen-containing magnesium compound.

Preferably, the contacting of the halogen-containing magnesium compound with the alcohols is carried out in a hydrocarbon medium usually at room temperature or a higher temperature, and depending upon the types of these compounds, at more than about 65° C., preferably about 80° to about 300° C., more preferably at about 100° to about 200° C. The contact time can also be properly selected. For example, it is about 15 minutes to about 5 hours, preferably about 30 minutes to about 2 hours. Illustrative of suitable alcohols having at least 6 carbon atoms are $C_6$–$C_{20}$ aliphatic alcohols such as 2-methylpentanol, 2-ethylbutanol, n-heptanol, n-octanol, 2-ethylhexanol, decanol, dodecanol, tetradecyl clcohol, undecenol, oleyl alcohol and stearyl alcohol; $C_6$–$C_{20}$ alicyclic alcohols such as cyclohexanol and methylcyclohexanol; $C_7$–$C_{20}$ aromatic alcohols such as benzyl alcohol, methylbenzyl alcohol, isopropylbenzyl alcohol, alpha-methylbenzyl alcohol and alpha,alpha-dimethylbenzyl alcohol; and $C_6$–$C_{20}$ aliphatic alcohols containing an alkoxy group, such as n-butyl Cellosolve (=ethylene glycol mono-n-butyl ether) and 1-butoxy-2-propanol. Examples of other alcohols are alcohols having not more than 5 carbon atoms such as methanol, ethanol, propanol, butanol, ethylene glycol and methyl carbitol.

When the carboxylic acid is used as an electron donor, organic carboxylic acids having at least 7 carbon atoms are suitable. Examples include those having 7 to 20 carbon atoms, such as caprylic acid, 2-ethylhexanoic acid, undecylenic acid, undecanoic acid, nonylic acid and octanoic acid.

Suitable aldehydes for used as the electron donor are those having at least 7 carbon atoms. Examples are those having 7 to 18 carbon atoms, such as capric aldehyde, 2-ethyhexyl aldehyde, capryl aldehyde and undecylic aldehyde.

Suitable amines are those having at least 6 carbon atoms. Examples include amines having 6 to 18 carbon atoms, such as heptylamine, octylamine, nonylamine, decylamine, laurylamine, undecylamine and 2-ethylhexylamine.

Illustrative of the ether as the electron donor is tetrahydrofuran.

The preferred amounts of these carboxylic acids, aldehydes, amines and ethers and the preferred temperatures at which they are used are much the same as described hereinabove.

The hydrocarbon solvent solution of the magnesium compound (i) may also be formed by using magnesium metal or another magnesium compound capable of being converted to the magnesium compound (i), and dissolving it in the hydrocarbon solvent while converting it to the magnesium compound (i). For example, this can be achieved by dissolving or suspending a magnesium compound having an alkyl, alkoxy, aryloxy, acyl, amino or hydroxyl group, magnesium oxide, or metallic magnesium in a hydrocarbon solvent having the alcohol, amine, aldehyde, carboxylic acid, ether, etc. dissolved therein, and forming a halogen-containing magnesium compound (i) having no reducing ability while halogenating it with a halogenating agent such as a hydrogen halide, a halogen-containing silicon compound, halogen, a halogen-containing aluminum compound, a halogen-containing lithium compound or a halogen-containing sulfur compound. Alternatively, it is possible to treat a Grignard reagent, a dialkyl magnesium, magnesium hydride or a complex of such a magnesium compound with another organometalic compound, for example a magnesium compound having reducing ability represented by the formula $M_\alpha Mg_\beta R^1_p R^2_q X_r Y_s$ wherein M represents aluminum, zinc, boron or beryllium, $R^1$ and $R^2$ represent a hydrocarbon group, X and Y represent a group of the formula $OR^3$, $OSiR^4 R^5 R^6$, $NR^7 R^8$ or $SR^9$, $R^3$, $R^4$, $R^5$, $R^6$, $R^7$ and $R^8$ represent a hydrogen atom or a hydrocarbon group, $R^9$ represents a hydrocarbon group, $\alpha$ and $\beta$ are greater than zero, p, q, r and s are a number of at least 0, m represents the atomic valence of M, $\beta/\alpha \geq 0.5$, $p+q+r+s=m\alpha+2\beta$, and $0 \leq (r+s)/(\alpha+\beta) < 1.0$ with a compound capable of destroying reducing ability, such as an alcohol, a ketone, an ester, an ether, an acid halide, a silanol, a siloxane, oxygen, water, an acetal, or an alkoxy or aryloxy compound of silicon or aluminum, and dissolving the resulting magnesium compound (i) having no reducing ability in the hydrocarbon solvent.

In the above formula, examples of the hydrocarbon groups are $C_1$ to $C_{20}$ alkyl groups such as an ethyl group, propyl group, butyl group, amyl group, hexyl group, octyl group and dodecyl group, and $C_6$ to $C_{20}$ aryl groups such as a phenyl group and tolyl group.

Various titanium compounds can be used as the titanium compound (ii) in the preparation of the solid titanium catalyst component (A). Preferred are tetravalent titanium compounds of the formula

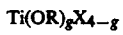

$$Ti(OR)_g X_{4-g}$$

wherein R represents a hydrocarbon group, X represents a halogen atom and g is a number represented by $0 \leq g \leq 4$. In the above formula, examples of the hydrocarbon group are $C_1$–$C_{10}$ alkyl groups, and a phenyl group which may have a substituent such as a lower alkyl group, for example $C_1$ to $C_4$ alkyl group, and a halogen atom.

Specific examples of the titanium compound (ii) include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$; alkoxy titanium dihalides such as $Ti(OCH_3)_2Cl_2$, $Ti(OC_2H_5)_2Cl_2$, $Ti(On-C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(On-C_4H_9)_3Cl$ and $Ti(OC_2H_5)_3Br$; tetraalkoxy titaniums such as $Ti(OCH_3)_4$, $Ti(OC_2H_5)_4$ and $Ti(On-C_4H_9)_4$; mixtures of these; and mixtures of these with hydrogen halides, halogens, other metallic compounds such as aluminum compounds or silicon compounds, or sulfur compounds. Of these, halogen-containing titanium compounds are preferred. Titanium tetrahalides, above all titanium tetrachloride, are especially preferred.

The titanium compound (ii) in the liquid state may be one, or a mixture, of titanium compounds which are liquid themselves, or may be a solution of the titanium compound in a solvent such as hydrocarbons.

In the present invention, the solid titanium catalyst component (A) containing magnesium, titanium, halogen and a compound selected from the group consisting of esters of polycarboxylic acids and esters of polyhydroxy compounds can be prepared in the following manner.

A liquid hydrocarbon solution of the magnesium compound (i) is contacted with the titanium compound (ii) in the liquid state to form a solid product. Or a liquid hydrocarbon solution of a mixture of the magnesium compound (i) and the titanium compound (ii) is first prepared, and then a solid product is formed from it. The reaction of forming the solid product is carried out in the presence of at least one electron donor (D) specified hereinabove, and the product is contacted with the ester (E) selected from the group consisting of esters of polycarboxylic acids and esters of polyhydroxy compounds during the formation of the solid product [embodiment (a)] or after the formation of the solid product [embodiment (b)].

The electron donor (D) is selected from the group consisting of monocarboxylic acid esters, aliphatic carboxylic acids, carboxylic acid anhydrides, ketones, aliphatic ethers, aliphatic carbonates, alkoxy group-containing alcohols, aryloxy group-containing alcohols, organic silicon compounds having an Si—O—C bond and organic phosphorus compounds having a P—O—C bond. Examples of preferred electron donors include $C_{21}$–$C_{20}$ monocarboxylic acid esters, $C_1$–$C_{20}$, preferably $C_1$ to $C_6$, aliphatic carboxylic acids, $C_4$–$C_{20}$ carboxylic acid anhydrides, $C_3$–$C_{20}$ ketones, $C_2$–$C_{16}$ aliphatic ethers, $C_2$–$C_{16}$ aliphatic carbonates, $C_3$–$C_{20}$ alkoxy group-containing alcohols, $C_3$–$C_{20}$ aryloxy group-containing alcohols, organic silicon compounds having an Si—O—C bond in which the organic group has 1 to 10 carbon atoms, and organic phosphorus compounds having a P—O—C bond in which the organic group has 1 to 10 carbon atoms.

Specific examples of the monocarboxylic acid esters are methyl formate, methyl acetate, ethyl acetate, vinyl acetate, propyl acetate, iso-butyl acetate, tertbutyl acetate, octyl acetate, cyclohexyl acetate, ethyl propionate, methyl butyrate, ethyl valerate, ethyl pyruvate, ethyl pivalate, methyl chloroacetate, ethyl dichloroacetate, methyl methacrylate, ethyl crotonate, methyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, and ethyl ethoxybenzoate.

Specific examples of the aliphatic carboxylic acids are formic acid, acetic acid, propionic acid, butyric acid and valeric acid.

Specific examples of the carboxylic acid anhydrides are acetic anhydride, maleic anhydride, benzoic anhydride, phthalic anhydride, trimellitic anhydride and tetrahydrophthalic anhydride.

Specific examples of the ketones are acetone, methyl ethyl ketone, methyl isobutyl ketone, ethyl n-butyl ketone, acetophenone, benzophenone, cyclohexanone, and benzoquinone.

Specific examples of the aliphatic ethers include methyl ether, ethyl ether, isopropyl ether, butyl ether, amyl ether, ethyl benzyl ether, ethylene glycol dibutyl ether, and anisole.

Specific examples of the alkoxy group-containing alcohols are butyl Cellosolve (ethylene glycol monobutyl ether) and ethyl Cellosolve (ethylene glycol monoethyl ether).

Specific examples of the aliphatic carbonates are dimethyl carbonate, diethyl carbonate, and ethylene carbonate.

Specific examples of the organic silicon compounds having as Si—O—C bond are methyl silicate, ethyl silicate and diphenyldimethoxysilane.

Specific examples of the organic phosphorus compounds having a P—O—C bond are trimethyl phosphite and triethyl phosphite.

If desired, these electron donor compounds may be formed in situ during the formation of the catalyst component (A).

Illustrative of preferred polycarboxylic acid esters or polyhydroxy compound esters used in the preparation of the catalyst component (A) are those having a skeleton represented by the formula

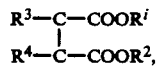

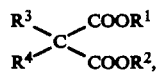

or

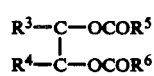

wherein $R^1$ represents a substituted or unsubstituted hydrocarbon group; $R^2$, $R^5$ and $R^6$ represent a hydrogen atom or a substituted or unsubstituted hydrocarbon group; $R^3$ and $R^4$ represent a hydrogen atom or a substituted or unsubstituted hydrocarbon group and preferably at least one of $R^3$ and $R^4$ is a substituted or unsubstituted hydrocarbon group, or $R^3$ and $R^4$ may be linked to each other; and the substituted hydrocarbon group mentioned above is a substituted hydrocarbon group containing a hetero atom such as N, O and S, for example one containing such a group as C—O—C, COOR, COOH, OH, SO₃H, —C—N—C— or NH₂.

Examples of the hydrocarbon group in the above formula include $C_1$–$C_{10}$ alkyl groups such as a methyl, ethyl, propyl, butyl, amyl, hexyl or octyl group, $C_6$–$C_{16}$ aryl groups such as a phenyl, tolyl, xylyl, benzyl or naphthyl group, $C_1$–$C_{10}$ alkylidene groups such as a methylidene, ethylidene or propylidene group, and $C_1$–$C_{10}$ alkenyl groups such as a vinyl, allyl or propenyl group. Examples of the ring formed by the bonding of $R^3$ and $R^4$ are cyclohexane, benzene, naphthalene, norbornane and cyclopentane rings.

These hydrocarbon groups may contain such substituents as exemplified above.

Among these electron donors (D), monocarboxylic acid esters, aliphatic carboxylic acids, carboxylic acid anhydrides, ketones, alkoxy group-containing alcohols and organic silicon compounds having an Si—O—C bond are preferred. The monocarboxylic acid esters and carboxylic acid anhydrides are especially preferred.

Specific examples of preferred polycarboxylic acid esters (E) include $C_5$–$C_{30}$ aliphatic polycarboxylic acid esters such as diethyl methylsuccinate, diisobutyl alpha-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monoisoctyl maleate, diisooctyl maleate, diisobutyl maleate, diisobutyl butylmaleate, diisopropyl beta-methylglutarate, diallyl ethylsuccinate, di-2-ethylhexyl fumarate, diisooctyl citraconate, and esters of long-chain dicarboxylic acids (e.g., diethyl adipate, diisobutyl adipate, diisopropyl sebacate, di-n-butyl sebacate, di-n-octyl sebacate and di-2-ethylhexyl sebacate); $C_{10}$–$C_{30}$ alicyclic polycarboxylic acid esters such as diethyl 1,2-cyclohexanecarboxylate and diisobutyl 1,2-cyclohexanecarboxylate; $C_{10}$–$C_{30}$ aromatic polycarboxylic acid esters such as monoethyl phthalate, dimethyl phthalate, methylethyl phthalate, monoisobutyl phthalate, diethyl phthalate, ethyl isobutylphthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzyl butyl phthalate, diphenyl phthalate, diethyl naphthalenedicarboxylate and dibutyl naphthalenedicarboxylate; and $C_8$–$C_{30}$ heterocyclic polycarboxylic acid esters such as esters of 3,4-furanedicarboxylic acid.

Illustrative of preferred esters of polyhydroxy compounds, (E), are esters formed between $C_6$ to $C_{16}$ aromatic polyhydroxy compounds and $C_1$ to $C_{12}$, preferably $C_1$ to $C_7$, aliphatic carboxylic acids such as 1,2-diacetoxybenzene, 1-methyl-2,3-diacetoxybenzene and 2,3-diacetoxynaphthalene.

In including the substance derived from the ester selected from the group consisting of esters of polycarboxylic acids and esters of polyhydroxy compounds into the catalyst component (A), it is not always necessary to use such a compound itself as a starting material. If desired, it is possible to use a compound capable of being converted to such a compound during the preparation of the titanium catalyst component (A) and convert it to the ester during the preparation of the catalyst component (A).

The amount of the electron donor (D) present during the formation of the solid product in the embodiment (a) or (b) is, for example, about 0.01 to about 1 mole, preferably about 0.05 to about 0.5 mole, per mole of the magnesium compound (i). By the selection of such an amount, the particle size of the solid product can be adjusted.

If the amount of the electron donor (D) is too large, it may be deposited too much on the solid product and may possibly exert adverse effects although the degree of adverse effects varies according to the type of the electron donor (D). It is preferred therefore to select a suitable amount within the above-exemplified range.

When the solid product is formed in the presence of the polycarboxylic acid ester and/or polyhydroxy compound ester, (E), in accordance with the embodiment (a), the ester (E) is used preferably in an amount of about 0.01 to about 1 mole, especially from about 0.1 to about 0.5 mole, per mole of the magnesium compound (i). Preferably, the molar ratio of the ester (E) deposited on the solid product to the electron donor (D) is adjusted to 1: about 0.01-about 2, especially 1: about 0.1-about 1.

In order to form a solid product containing magnesium and titanium from a hydrocarbon solution of the magnesium compound (i) and the titanium compound (ii) in the liquid state, it is preferred to employ a method of reacting the two liquids by contacting them with each other. Preferably, a halogen-containing compound is used as the titanium compound (ii) in an amount sufficient to form the solid product. The amount of the titanium compound (ii) used may vary depending upon its type, the contacting conditions and the amounts of the electron donor (D) and other ingredients. Preferably, its amount is at least 1 mole, usually about 2 to about 200 moles, especially about 3 to about 100 moles, per mole of the magnesium compound (i).

If the solid product is difficult to form by the mere contacting of the liquid hydrocarbon solution of the magnesium compound (i) with the titanium compound (ii) in the liquid state, or if the solid product is difficult to form by simply leaving the hydrocarbon solution of the compounds (i) and (ii) to stand, an additional amount of the titanium compound (ii), preferably a halogen-containing titanium compound (ii), may be added, or another precipitating agent may be added, so as to form the solid product. Illustrative of such precipitating agent are halogenating agents such as halogens, halogenated hydrocarbons, halogen-containing silicon compounds, halogen-containing aluminum compounds, halogen-containing lithium compounds, halogen-containing sulfur compounds and halogen-containing antimony compounds. Specific examples are chlorine, bromine, hydrogen chloride, hydrochloric acid, phosphorus pentachloride, thionyl chloride, thionyl bromide, sulfuryl chloride, phosgene, and nitrosyl chloride.

The solid product differs in shape or size depending upon the conditions for its formation. In order to obtain a solid product having a uniform shape and a uniform particle size, it is preferred to avoid its rapid formation. For example, when the solid product is to be formed by mixing the compounds (i) and (ii) in the liquid state and reacting them with each other, it is advisable to mix them at a sufficiently low temperature which does not cause rapid formation of a solid product, and then to elevate the temperature gradually. According to this method, there can easily be obtained a granular or spherical solid product having a relatively large particle diameter and a narrow particle size distribution.

When slurry polymerization or vapor phase polymerization is carried out by using the granular or spherical solid catalyst component having a good particle size distribution which can be obtained as above, the resulting polymer is granular or spherical and has a narrow particle size distribution, a high bulk density and good flowability. The term "granular", as used herein denotes particles which look like an assembly of fine powders when examined by an enlarged scale photograph. Particles ranging from those having many uneven parts to those close to a true sphere can be obtained as the granular product depending upon the method of preparing the solid catalyst component.

The contacting of the liquid hydrocarbon solution of the magnesium compound (i) with the titanium compound (ii) in the liquid state may be effected, for example, at a temperature of about $-70°$ C. to about $+200°$ C. The temperatures of the two liquids to be contacted may be different from each other. Generally, it is frequently preferred to employ a contacting method not involving too high a temperature, in order to obtain a solid catalyst component having a desirable granular or spherical shape and high performance. For example, temperatures of about $-70°$ to about $+50°$ C. are preferred. If the contacting temperature is too low, precipitation of a solid product may sometimes be not observed. In such a case, it is desirable to elevate the temperature to about 50° to about 150° C. for example, or continue the contacting for a longer period of time until precipitation of the solid product occurs.

The solid product is preferably washed with an excess of a liquid titanium compound or a liquid halogenated hydrocarbon, preferably titanium tetrachloride, 1,2-dichloroethane, chlorobenzene, methyl chloride and hexachloroethane at least once at a temperature of, for example, about 20° to about 150° C. Then, the product is usually washed with a hydrocarbon and can be used in polymerization. Examples of the hydrocarbon may be the same as those exemplified hereinabove with regard to the formation of the liquid hydrocarbon solution of the magnesium compound (i).

The method according to the embodiment (a) is excellent because its operation is simple and a solid catalyst component (A) of high performance can be obtained.

In the embodiment (b), the following procedure can be taken.

A suspension of the solid product is prepared after forming a hydrocarbon solution of the magnesium compound (i) and the titanium compound (ii) or by contacting the magnesium compound (i) in the liquid state and the titanium compound in (ii) in the liquid state as in the embodiment (a). Generally, a method can be employed in which the polycarboxylic acid ester and/or polyhydroxy compound ester is added to this suspension, and reacted at a temperature of, for example, about 0° to about 150° C. The amount of the electron donor used is the same as in the embodiment (a). The resulting solid product can be washed at least once with a liquid titanium compound, preferably an excess of titanium tetrachloride, at a temperature of about 20° to about 150° C.

If desired, the embodiments (a) and (b) may be used together in the present invention.

In the formation of the solid product in this invention in the manner described above, a porous inorganic and/or organic solid compound may be present so that the solid product is deposited on the surface of the porous solid compound. In this case, it is possible to preliminarily contact the porous solid compound with the magnesium compound (i) in the liquid state, and then contact the porous solid compound holding the liquid magnesium compound with the liquid titanium compound (ii).

Illustrative of the porous solid compound are silica, alumina, polyolefins, and products obtained by treating these compounds with halogen-containing compounds such as chlorine, bromine, hydrogen chloride, 1,2-dichloroethane and chlorobenzene.

The solid titanium catalyst component (A) used in this invention may be one obtained by the aforesaid embodiment (a) or (b), with or without further washing with a titanium compound, a hydrocarbon, etc.

Preferably, the solid titanium catalyst component (A) which can be obtained by any of the above-described embodiments is used for polymerization after it is well washed with a hydrocarbon. The resulting solid titanium catalyst component (A) preferably has such a composition that the magnesium/titanium atomic ratio is, for example, from about 2 to about 100, preferably from about 4 to about 50, more preferably from about 5 to about 30, the halogen/titanium atomic ratio is, for example, from about 4 to about 100, preferably from about 5 to about 90, more preferably from about 8 to about 50, and the electron donor/titanium mole ratio is, for example, from about 0.01 to about 100, preferably from about 0.2 to about 10, more preferably from about 0.4 to about 6. As stated hereinabove, the shape of the catalyst component (A) is, in many cases, granular or nearly spherical. Usually, it has a specific surface area of, for example, at least about 10 m$^2$/g, preferably about 100 to about 1000 m$^2$/g.

The halogen in the solid titanium catalyst component (A) is chlorine, bromine, iodine, fluorine, or two or more of these, preferably chlorine. The electron donor included in the catalyst component (A) at least contains the ester (E) selected from esters of polycarboxylic acids and esters of polyhydroxy compounds, and sometimes contains the electron donor (D) as well.

The ratio of the ester (E) to the other electron donor (D) varies depending upon the type of the electron donor (D). The catalyst component (A) shows good performance even if it contains not more than about 2 moles, preferably not more than about 1 mole, especially preferably not more than 0.5 mole, per mole of the ester (E).

According to this invention, olefins are polymerized by using a catalyst system composed of the solid titanium catalyst component (A) prepared as above, the organometallic compound (B) of the metal of Groups I to III of the periodic table, and the organic silicon compound (C).

As examples of the organometallic compound (B), the following compounds may be cited.

(1) Organoaluminum compounds having at least one Al—C bond in the molecule, for example organoaluminum compounds of the general formula $$R^1{}_mAl(OR^2)_nH_pX_q$$

wherein $R^1$ and $R^2$ are identical or different and each represents a hydrocarbon group, for example a hydrocarbon group having 1 to 15 carbon atoms, preferably 1 to 4 carbon atoms, X represents a halogen atom, m is a number represented by $0<m\leq3$, n is a number represented by $0\leq n<3$, p is a number represented by $0\leq p<3$, q is a number represented by $0\leq q<3$, and $m+n+p+q=3$.

(2) Complex alkylated products of aluminum and a Group I metal represented by the general formula $$M^1AlR^1{}_4$$

wherein $M^1$ represents Li, Na and K, and $R^1$ is as defined above.

(3) Dialkyl compounds of a Group III metal represented by the general formula $$R^1R^2M^2$$

wherein $R^1$ and $R^2$ are as defined above, and $M^2$ is Mg, Zn and Cd.

In the above formulae, examples of the hydrocarbon group for $R^1$ and $R^2$ are alkyl groups and aryl groups.

Examples of the organoaluminum compounds (1) are shown below.

Compounds of the general formula $R^1{}_mAl(OR^2)_{3-m}$ (wherein $R^1$ and $R^2$ are as defined above, m is preferably a number represented by $1.5\leq m\leq3$;

compounds of the general formula $R^1{}_mAlX_{3-m}$ wherein $R^1$ is as defined above, X is halogen, and m is preferably a number represented by $0<m<3$;

compounds represented by the general formula $R^1{}_mAlH_{3-m}$ wherein $R^1$ is as defined above, and m is preferably a number represented by $2\leq m<3$, and compounds represented by the general formula $R^1{}_mAl(OR^2)_nX_q$ wherein $R^1$ and $R^2$ are as defined above, X represents halogen, $0<m\leq3$, $0\leq n<3$, $0\leq q<3$, and $m+n+q=3$.

Specific examples of the organoaluminum compounds of formula (1) are trialkyl aluminums such as triethyl aluminum and tributyl aluminum; trialkenyl aluminums such as triisoprenyl aluminum; partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R^1{}_{2.5}Al(OR^2)_{0.5}$; partially halogenated alkyl aluminums, for example, dialkyl aluminum halide such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

Examples of the compounds mentioned in (2) above are LiAl(C$_2$H$_5$)$_4$ and LiAl(C$_7$H$_{15}$)$_4$.

Examples of the compounds mentioned in (3) above are diethyl zinc and diethyl magnesium. Alkyl magnesium halides such as ethyl magnesium chloride may also be used.

Organoaluminum compounds in which two or more aluminum atoms are bonded through an oxygen or nitrogen atom, similar to the compounds (1), may also be used. Examples of such aluminum compounds are $(C_2H_5)_2AlOAl(C_2H_5)_2$,

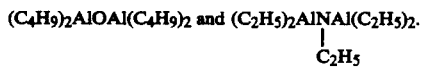

Among the above organoaluminum compounds, trialkyl aluminums and alkyl aluminums in which two or more aluminums are bonded are preferred.

Illustrative of the organic silicon compound (C) having an Si—O—C or Si—N—C bond are alkoxysilanes and aryloxysilanes. For example, there may be cited organic silicon compounds represented by the following general formula

wherein R represents a hydrocarbon group, such as an alkyl, cycloalkyl, aryl, alkenyl, haloalkyl, or aminoalkyl group, or halogen, $R^1$ represents a hydrocarbon group such as an alkyl, cycloalkyl, aryl, alkenyl or alkoxyalkyl group, and n is a number represented by $0 \leq n \leq 3$, preferably $0 \leq n \leq 2$, and n R groups, or $(4-n)OR^1$ groups may be indentical or different.

In the above formula, R is preferably a $C_1$-$C_{20}$ hydrocarbon group, such as a $C_1$-$C_{10}$ alkyl group, a $C_5$-$C_{12}$ cycloalkyl group, a $C_6$-$C_{20}$ aryl group, a $C_1$-$C_{10}$ alkenyl group, a $A_1$-$C_{10}$ haloalkyl group, or a $C_1$-$C_{10}$ aminoalkyl group, and a halogen atom such as chlorine atom; and $R^1$ is preferably a $C_1$-$C_{20}$ hydrocarbon group, such as a $C_1$-$C_{10}$ alkyl group, a $C_5$-$C_{12}$ cycloalkyl group, a $C_6$-$C_{20}$ aryl group, a $C_2$-$C_{10}$ alkenyl group, or a $C_2$-$C_{10}$ alkoxy alkyl group.

Other examples of the catalyst component (C) include siloxanes having the group $OR^1$ and silyl esters of carboxylic acid. Examples of $R^1$ are the same as those exemplified above. There may also be used the product of reaction of a compound having no Si—O—C bond with a compound having an O—C bond obtained either in advance or in situ. For example, there can be cited the joint use of a halogen-containing silane compound containing no Si—O—C bond or silicon hydride with an alkoxy group-containing aluminum compound, an alkoxy group-containing magnesium compound, another metal alcoholate, an alcohol, a formate ester, ethylene oxide, etc. The organic silicon compound may contain another metal such as aluminum and tin.

Examples of preferred organic silicon compounds as component (C) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(betamethoxyethoxy)silane, vinyltriacetoxysilane, dimethyltetraethoxydisiloxane and phenyldiethoxydiethylaminosilane. Of these, methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenylmethoxysilane (the compounds of formula $R_nSi(OR^1)_{4-n}$ given above) are especially preferred.

The component (C) may be used in the form of an adduct with other compounds.

According to this invention, there is provided a process for producing olefin polymers or copolymers which comprises polymerizing or copolymerizing olefins or copolymerizing at least one olefin with a minor amount, for example up to 10 mole %, of a diene in the presence of a catalyst system composed of the solid titanium catalyst component (A), the organometallic compound (B) and the organic silicon compound (C).

Illustrative of olefins which can be used are olefins having 2 to 10 carbon atoms such as ethylene, propylene, 1-butene, 4-methyl-1-pentene and 1-octene. They may be homopolymerized or random-copolymerized or block-copolymerized. The diene may be a polyunsaturated compound such as conjugated dienes or nonconjugated dienes. Specific examples include butadiene, isoprene, 1,3-pentadiene, 1,4-pentadiene, 1,5-hexadiene, 1,4-hexadiene, ethylidene norbornene, vinyl norbornene and 1,7-octadiene.

The catalyst system of this invention can be advantageously used in the polymerization of copolymerization of alpha-olefins having at least 3 carbon atoms, specifically in the polymerization or copolymerization of alpha-olefins having 3 to 10 carbon atoms or the copolymerization of at least one such alpha-olefin with up to 10 mole % of ethylene and/or a diene.

The catalyst system of this invention shows the excellent characteristic that when used in the polymerization of ethylene, it gives a high yield of a polymer having a narrow particle size distribution, a high bulk density and a narrow distribution of molecular weight.

The polymerization can be carried out either in the liquid or vapor phase. When the liquid-phase polymerization is carried out, inert solvents such as hexane, heptane and kerosene may be used as a reaction medium. If desired, the olefin itself may be used as the reaction medium. The amount of the catalyst can be properly selected. For example, in a preferred embodiment, per liter of the reaction solvent in the case of the liquid-phase reaction or per liter of the volume of the reaction zone in the case of the vapor-phase reaction, the component (A) is used in an amount of 0.0001 to 1 millimole as the titanium atom; the component (B) is used in such a proportion that the amount of the metal atom in the component (B) is 1 to 2,000 moles, preferably 5 to 500 moles, per mole of the titanium atom in the component (A); and the component (C) is used in such a proportion that the amount of the silicon atom in the component (C) is 0.001 to 10 moles, preferably 0.01 to 2 moles, especially preferably 0.05 to 1 mole, per mole of the metal atom in the component (B).

The catalyst components (A), (B) and (C) may be contacted with one another before or during the polymerization. In contacting them before the polymerization, only two of them may be freely selected and contacted. Or two or three components may be partly taken up and contacted with each other. The contacting of these components before the polymerization may be carried out in an atmosphere of an inert gas or in an atmosphere of an olefin.

The polymerization temperature is preferably about 20° to about 200° C., more preferably about 50° to about 180° C. The pressure is from atmospheric pressure to about 100 kg/cm², preferably from about 2 to about 50 kg/cm². The polymerization can be carried out batchwise, semicontinuously, or continuously. Or the polymerization may also be carried out in two or more stages having different reaction conditions.

When the process of this invention is applied to the stereospecific polymerization of alpha-olefins having at least 3 carbon atoms, polymers having a high stereospecificity index can be produced with a high catalytic efficiency. While an attempt to obtain a polymer having a high melt index by using hydrogen in the polymerization of an olefin using the hitherto proposed solid titanium-containing catalyst components tends to result in not a small reduction in stereospecificity, the use of the catalyst system in accordance with this invention can reduce this tendency.

Having regard to the high activity of the catalyst, the yield of the polymer per unit amount of the solid titanium catalyst component (A) is larger than that in the prior art when polymers of the same stereospecificity index are to be obtained. Hence, the catalyst residue, particularly the halogen content, of the resulting polymer can be decreased. This not only enables the catalyst removing operation to be omitted, but also can markedly inhibit the corroding tendency of molds during molding.

When the process of this invention is applied to slurry polymerization or vapor phase polymerization, there can be formed a granular or nearly spherical polymer which looks as if it were the product of aggregation of fine powders. Such a granular or spherical polymer has good flowability and in some applications, can be directly used without pelletization. Another advantage is that the melt index of the polymer can be changed by using a lesser amount of a molecular weight controlling agent such as hydrogen than in the case of conventional catalyst systems, and that surprisingly, by increasing the amount of the molecular weight controlling agent, the activity of the catalyst rather tends to increase contrary to the conventional catalysts. With the conventional catalyst systems, the increasing of the amount of the molecular weight controlling agent in an attempt to obtain a polymer having a high melt index leads to the decrease of the partial pressure of the olefin monomer and naturally to the decrease of the activity of the catalyst system. The catalyst system of this invention gives rise to no such problem, and its activity is rather increased by increasing the amount of the molecular weight controlling agent.

While the conventional catalyst systems decrease in activity with the passage of the polymerization time, such a phenomenon is scarcely noted in the catalyst system of this invention. The present invention brings about the advantage that even when the catalyst system is used in a multi-stage continuous polymerization process, the amount of the polymer product can be greatly increased.

Since the catalyst system of this invention is very stable at high temperatures, a reduction in stereospecificity is hardly observed even when propylene is polymerized at a temperature of, for example, about 90° C.

The following Examples illustrate the present invention more specifically.

EXAMPLE 1

Preparation of a solid titanium catalyst component (A)

Anhydrous magnesium chloride (4.76 g; 50 millimoles), 25 ml of decane and 23.4 ml (150 millimoles) of 2-ethylhexyl alcohol were reacted at 130° C. for 2 hours to form a uniform solution. Phthalic anhydride (1.11 g; 7.5 millimoles) was added to the solution, and the mixture was further stirred at 130° C. for 1 hour to dissolve phthalic anhydride in the uniform solution. The resulting uniform solution was cooled to room temperature, and wholly added dropwise over the course of 1 hour to 200 ml (1.8 moles) of titanium tetrachloride kept at −20° C. After the addition, the mixture was heated to 110° C. over the course of 4 hours, and when a temperature of 110° C. was reached, 2.68 ml (12.5 millimoles) of diisobutyl phthalate was added. The mixture was then maintained at this temperature for 2 hours with stirring. After the reaction, the reaction mixture was hot-filtered to collect the solid portion. The solid portion was again suspended in 200 ml of titanium tetrachloride, and reacted at 110° C. for 2 hours. After the reaction, the solid portion was collected by hot filtration and washed with decane kept at 110° C. and hexane until no free titanium compound was detected in the washings.

The solid titanium catalyst component (A) synthesized by the above method was stored as a slurry in hexane. A part of the slurry was dried in order to examine the composition of the catalyst. It was found that the resultant solid titanium catalyst component (A) contained 3.1% by weight of titanium, 56.0% by weight of chlorine, 17.0% by weight of magnesium and 20.9% by weight of diisobutyl phthalate.

Polymerization

A 2-liter autoclave was charged with 750 ml of purified hexane, and in an atmosphere of propylene at room temperature, 2.51 millimoles of triethyl aluminum, 0.125 millimole of phenyltriethoxysilane and 0.015 millimole, calculated as the titanium atom, of the catalyst component (A) prepared as above were introduced into the autoclave. After introducing 200 ml of hydrogen, the temperature was raised to 70° C., and propylene was polymerized for 2 hours. During the polymerization, the pressure was maintained at 7 kg/cm².G.

After the polymerization, the slurry containing the resulting polymer was filtered to separate it into a white powdery polymer and a liquid layer. After drying, the amount of the white powdery polymer was 379.2 g. The polymer had a boiling n-heptane extraction residue of 98.9%, a melt index (MI) of 7.5 and an apparent density of 0.44 g/ml. The particle size distribution of the white powdery polymer was as shown in Table 1. Concentrating the liquid layer yielded 1.9 g of a solvent-soluble polymer. Accordingly, the activity was 25,400 g-PP/mmole-Ti, and the isotacticity index (II) of the entire polymer was 98.4%.

TABLE 1

| > 1190μ | > 840μ | >420μ | >250μ | >177μ | >105μ | >44μ | 44μ> |
|---|---|---|---|---|---|---|---|
| 0 | 0 | 4.1 | 95.7 | 0.2 | 0 | 0 | 0 |

EXAMPLES 2 TO 6

Example 1 was followed except that the amount of hydrogen used in the polymerization was changed to 100 ml, 400 mml, 800 ml, 1,000 ml and 2,000 ml, respectively. The results are shown in Table 2.

TABLE 2

| Example | Amount of hydrogen (ml) | MI | Activity (g-PP/mmol-Ti) | II (%) of the white powdery polymer | II (%) of the entire polymer |
|---|---|---|---|---|---|
| 2 | 100 | 2.7 | 20,000 | 98.9 | 98.4 |
| 1 | 200 | 7.5 | 25,400 | 98.9 | 98.4 |
| 3 | 400 | 20 | 30,800 | 98.6 | 98.0 |
| 4 | 800 | 69 | 32,100 | 98.3 | 97.7 |
| 5 | 1000 | 145 | 34,000 | 97.7 | 97.0 |
| 6 | 2000 | 280 | 29,600 | 97.4 | 96.6 |

EXAMPLES 7 AND 8

Example 1 was followed except that the polymerization temperature was changed to 80° C. and 90° C., respectively. The results are shown in Table 3.

TABLE 3

| Example | Polymerization temperature (°C.) | Activity (g-PP/mmole-Ti) | II (%) of the white powdery polymer | II (%) of the entire polymer | Bulk density (g/ml) | MI |
|---|---|---|---|---|---|---|
| 1 | 70 | 25,400 | 98.9 | 98.4 | 0.44 | 7.4 |
| 7 | 80 | 25,300 | 99.2 | 98.6 | 0.43 | 10.1 |
| 8 | 90 | 22,600 | 98.7 | 98.1 | 0.41 | 21.3 |

EXAMPLE 9

A 2-liter autoclave was charged with 500 g of propylene, and at room temperature, 0.25 mmole of triethyl aluminum, 0.025 millimole of diphenyldimethoxysilane and 0.005 mmole, calculated as the titanium atom, of the catalyst component (A) described in Example 1 were introduced into the autoclave. Hydrogen (750 ml) was further introduced into the autoclave. The temperature was raised to 80° C., and propylene was polymerized for 1 hour. After drying, the amount of the entire polymer yielded was 192.3 g. The entire polymer had a boiling n-heptane extraction residue of 98.6%, an MI of 3.2 and an apparent density of 0.48 g/ml. Hence, the activity at this time was 38,500 g-PP/mmole-Ti.

EXAMPLES 10 TO 14

Example 9 was followed except that 0.375 millimole of triethyl aluminum, 0.0188 millimole of phenyltriethoxysilane and 0.0025 millimole, calculated as the titanium atom, of the catalyst component (A) described in Example 1 were used in the polymerization, and the polymerization time was changed to 15 minutes, 30 minutes, 1 hour, 2 hours, and 3 hours, respectively. The results are shown in Table 4.

TABLE 4

| Example | Polymerization time (minutes) | Activity (g-PP/mmole-Ti) | II (%) of the entire polymer | Bulk density (g/ml) |
|---|---|---|---|---|
| 10 | 15 | 10,400 | 97.0 | 0.47 |
| 11 | 30 | 25,200 | 98.2 | 0.48 |
| 12 | 60 | 32,800 | 98.3 | 0.49 |
| 13 | 120 | 72,400 | 97.9 | 0.48 |
| 14 | 180 | 88,400 | 97.9 | 0.49 |

EXAMPLE 15

A 2-liter autoclave was charged with 750 ml of purified hexane, and in an atmosphere of propylene at room temperature, 2.51 millimoles of triethyl aluminum, 0.125 millimole of diphenyldimethoxysilane and 0.015 millimole, calculated as the titanium atom, of the catalyst component (A) described in Example 1 were introduced into the autoclave. After introducing 200 ml of hydrogen, the temperature was raised to 70° C., and propylene was polymerized for 2 hours. During the polymerization, the pressure was maintained at 7 kg/cm$^2$.G. The reaction mixture was worked up by the same procedure as in Example 1. The results are shown in Table 5.

EXAMPLE 16

A 2-liter autoclave was charged with 750 ml of purified hexane, and in an atmosphere of propylene at room temperature, 2.51 millimoles of triethyl aluminum, 0.225 millimole of phenyltrimethoxysilane and 0.015 millimole, calculated as the titanium atom, of the catalyst component (A) described in Example 1 was charged. After introducing 200 ml of hydrogen, the temperature was raised to 70° C., propylene was polymerized for 2 hours. During the polymerization, the pressure was maintained at 7 kg/cm$^2$.G. The reaction mixture was worked up in the same way as in Example 1. The results are shown in Table 5.

EXAMPLE 17

A 2-liter autoclave was charged with 750 ml of purified hexane, and in an atmosphere of propylene at room temperature, 2.51 millimoles of triethyl aluminum, 0.30 millimole of vinyltrimethoxysilane and 0.015 millimole, calculated as the titanium atom, of the catalyst component (A) described in Example 1 were introduced into the autoclave. After introducing 200 ml of hydrogen, the temperature was raised to 70° C., and propylene was polymerized for 4 hours. During the polymerization, the pressure was maintained at 7 kg/cm$^2$.G. The reaction mixture was worked up in the same way as in Example 1. The results are shown in Table 5.

EXAMPLE 18

A 2-liter autoclave was charged with 750 ml of purified hexane, and in an atmosphere of propylene at room temperature, 2.51 millimoles of triethyl aluminum, 0.45 millimole of methyltrimethoxysilane and 0.015 millimoles, calculated as the titanium atom, of the catalyst component (A) described in Example 1 were introduced into the autoclave. After introducing 200 ml of hydrogen, the temperature was raised to 70° C., and propylene was polymerized for 2 hours. During the polymerization, the pressure was maintained at 7 kg/cm$^2$.G. The reaction mixture was worked up in the same way as in Example 1. The results are shown in Table 5.

EXAMPLE 19

A 2-liter autoclave was charged with 750 ml of purified hexane, and in an atmosphere of propylene at room temperature, 2.51 millimoles of triethyl aluminum, 0.30 millimole of tetraethoxysilane and 0.015 millimole, calculated as the titanium atom, of the catalyst component (A) described in Example 1 were introduced into the autoclave. After introducing 200 ml of hydrogen, the temperature was raised to 70° C., and propylene was polymerized for 4 hours. During the polymerization, the pressure was maintained at 7 kg/cm$^2$.G. The reaction mixture was worked up in the same way as in Example 1. The results are shown in Table 5.

EXAMPLE 20

A 2-liter autoclave was charged with 750 ml of purified hexane, and in an atmosphere of propylene at room temperature, 2.51 millimoles of triethyl aluminum, 0.225 millimole of ethyltriethoxysilane and 0.015 millimole, calculated as the titanium atom, of the catalyst component (A) described in Example 1 were introduced into the autoclave. After introducing 200 ml of hydrogen, the temperature was raised to 70° C., and propylene was polymerized for 4 hours. During the polymerization, the pressure was maintained at 7 kg/cm$^2$.G. The reaction mixture was worked up in the same way as in Example 1. The results are shown in Table 5.

EXAMPLE 21

A 2-liter autoclave was charged with 750 ml of purified hexane, and in an atmosphere of propylene at room temperature, 2.51 millimoles of triethyl aluminum, 0.225 millimoles of vinyltriethoxysilane and 0.015 millimoles, calculated as the titanium atom, of the catalyst component (A) described in Example 1 were introduced into the autoclave. After introducing 200 ml of hydrogen, the temperature was raised to 70° C., and propylene was polymerized for 4 hours. The reaction mixture was worked up in the same way as in Example 1. The results are shown in Table 5.

EXAMPLE 22

A 2-liter autoclave was charged with 750 ml of purified hexane, and in an atmosphere of propylene at room temperature, 2.51 millimoles of triethyl aluminum, 0.225 millimole of methylphenyldimethoxysilane and 0.015 millimole, calculated as the titanium atom, of the catalyst component (A) described in Example 1 were introduced into the autoclave. After introducing 200 ml of hydrogen, the temperature was raised to 70° C., and propylene was polymerized for 2 hours. During the polymerization, the pressure was maintained at 7 kg/cm$^2$.G. The reaction mixture was worked up in the same way as in Example 1. The results are shown in Table 5.

EXAMPLE 23

A 2-liter autoclave was charged with 750 ml of purified hexane, and in an atmosphere of propylene at room temperature, 1.8 millimoles of triethyl aluminum, 0.45 millimole of monochlorodiethyl aluminum, 0.12 millimole of phenyltriethoxysilane, and 0.015 millimole, calculated as the titanium atom, of the catalyst component (A) described in Example 1 were introduced into the autoclave. After introducing 200 ml of hydrogen, the temperature was raised to 70° C., and propylene was polymerized for 2 hours. During the polymerization, the pressure was maintained at 7 kg/cm$^2$.G. The reaction mixture was worked up in the same way as in Example 1. The results are shown in Table 5.

TABLE 5

| Example | Organic silicon compound (C) | Activity (g-PP/ mmole-Ti) | II (%) of the entire polymer | MI | Bulk density (g/ml) |
|---|---|---|---|---|---|
| 15 | Diphenyldimethoxysilane | 31,600 | 98.9 | 6.3 | 0.45 |
| 16 | Phenyltrimethoxysilane | 23,700 | 98.6 | 5.2 | 0.45 |
| 17 | Vinyltrimethoxysilane | 19,200 | 97.6 | 25.0 | 0.44 |
| 18 | Methyltrimethoxysilane | 23,300 | 96.9 | 11.4 | 0.44 |
| 19 | Tetraethoxysilane | 22,300 | 96.8 | 58.0 | 0.43 |
| 20 | Ethyltriethoxysilane | 22,200 | 98.0 | 24.0 | 0.44 |
| 21 | Vinyltriethoxysilane | 18,700 | 98.0 | 27.0 | 0.43 |
| 22 | Methylphenyldimethoxysilane | 29,700 | 98.6 | 4.2 | 0.45 |
| 23 | Phenyltriethoxysilane | 23,100 | 97.6 | 7.6 | 0.44 |

EXAMPLE 24

Preparation of a solid titanium catalyst component (A)

Anhydrous magnesium chloride (4.76 g; 50 millimoles), 25 ml of decane and 23.4 ml (150 millimoles) of 2-ethylhexyl alcohol were reacted at 130° C. for 2 hours to form a uniform solution. Phthalic anhydride (1.11 g; 7.5 millimoles) was added to the solution. The mixture was stirred at 130° C. for 1 hour to dissolve phthalic anhydride. The resulting uniform solution was cooled to room temperature, and wholly added dropwise over the course of 1 hour to 200 ml (1.8 moles) of titanium tetrachloride kept at −20° C. After the addition, the temperature of the mixed solution was raised to 110° C. over the course of 4 hours. When the temperature reached 110° C., 3.5 g (12.5 millimoles) of di-n-butyl phthalate was added, and the mixture was maintained at the same temperature for 2 hours. After the lapse of the two hours, the solid portion was collected by hot-filtration from the reaction mixture. The solid portion was again suspended in 200 ml of titanium tetrachloride, and again heated at 120° C. for 2 hours. After the reaction, the solid portion was collected by hot filtration, and washed fully with decane kept at 120° C. and hexane until no free titanium compound was detected in the washings.

The resulting catalyst component (A) was stored as a slurry in hexane. A part of the slurry was dried in order to examine the composition of the catalyst. The resulting catalyst component (A) was found to contain 2.1% by weight of titanium.

Propylene was polymerized by using the resulting solid titanium catalyst component in the same way as in Example 1. The results are shown in Table 6.

EXAMPLE 25

Preparation of a solid titanium catalyst component (A)

Anhydrous magnesium chloride (4.76 g; 50 millimoles), 25 ml of decane and 23.4 ml (150 millimoles) of 2-ethylhexyl alcohol were reacted at 130° C. for 2 hours to form a uniform solution. Phthalic anhydride (1.11 g; 7.5 millimoles) was added to the solution, and the mixture was stirred at 130° C. for 1 hour to dissolve phthalic anhydride. The resulting uniform solution was cooled to room temperature, and wholly added dropwise over the course of 1 hour to 200 ml (1.8 moles) of titanium tetrachloride kept at −20° C. After the addition, the mixture was heated to 110° C. over the course of 4 hours. When the temperature reached 110° C., 2.6 ml (13.0 millimoles) of diethyl phthalate was added. The mixture was maintained at this temperature for 2 hours. After the reaction for 2 hours, the solid portion was collected from the reaction mixture by hot filtration. The solid portion was again suspended in 200 ml of titanium tetrachloride and again reacted at 120° C. for 2 hours. After the reaction, the solid portion was again collected by hot filtration, and washed with decane at kept at 120° C. and hexane until no free titanium compound was detected in the washings.

The resulting solid titanium catalyst component (A) prepared as above was stored as a slurry in hexane. A part of the slurry was dried in order to examine the composition of the catalyst. The resulting solid titanium catalyst component (A) was found to contain 4.0% by weight of titanium.

Using the resulting solid titanium catalyst component (A), propylene was polymerized in the same way as in Example 1. The results are shown in Table 6.

EXAMPLE 26

Preparation of a solid titanium catalyst component (A)

Anhydrous magnesium chloride (4.76 g; 50 millimoles), 25 ml of decane and 23.4 ml (150 millimoles) of 2-ethylhexyl alcohol were reacted at 130° C. for 2 hours to form a uniform solution. Phthalic anhydride (1.11 g; 7.5 millimoles) was added to the solution, and the mixture was stirred at 130° C. for 1 hour to dissolve the phthalic anhydride. The resulting uniform solution was cooled to room temperature, and wholly added dropwise over the course of 1 hour to 200 ml (1.8 moles) of titanium tetrachloride kept at −20° C. After the addition, the mixture was heated to 110° C. over the course of 4 hours. When the temperature reached 110° C., 2.9 ml (12.5 millimoles) of diisopropyl phthalate was added, and the mixture was maintained at the same temperature for 2 hours. After the reaction for two hours, the solid portion was collected from the reaction mixture by hot filtration. The solid portion was again suspended in 200 ml of titanium tetrachloride, and again reacted at 120° C. for 2 hours. After the reaction, the solid portion was again collected by hot filtration, and washed with decane kept at 120° C. and hexane until no free titanium compound was detected in the washings.

The solid titanium catalyst component (A) prepared as above was stored as a slurry in hexane. A part of the slurry was dried in order to examine the composition of the catalyst. The resulting solid titanium catalyst component (A) was found to contain 2.9% by weight of titanium.

Using the resulting solid titanium catalyst component (A), propylene was polymerized in the same way as in Example 1. The results are shown in Table 6.

TABLE 6

| Example | Ester (E) | Activity (g-PP/mmole-Ti) | II (%) of the entire polymer | MI | Bulk density (g/ml) |
|---|---|---|---|---|---|
| 24 | Di-n-butyl phthalate | 23,000 | 97.6 | 2.9 | 0.42 |
| 25 | Diethyl phthalate | 18,300 | 97.5 | 11.1 | 0.44 |
| 26 | Diisopropyl phthalate | 20,100 | 97.3 | 9.2 | 0.44 |

EXAMPLE 27

Preparation of a catalyst component (A)

$C_2H_5OMgCl$ (5.25 g), 23.2 ml of 2-ethylhexyl alcohol and 50 ml of decane were mixed at room temperature for about 1 hour. To the resulting uniform solution was added 1.11 g of phthalic anhydride, and the reaction was carried out at 130° C. for 1 hour to dissolve phthalic anhydride in the uniform solution. The solution was then cooled to room temperature. The uniform solution thus obtained was added dropwise with stirring over 1 hour to 200 ml of titanium tetrachloride kept at −20° C. The mixture was worked up in the same way as in Example 1 to form a catalyst component (A).

Polymerization

Propylene was polymerized in the same way as in Example 15 except that the catalyst component (A) prepared as above was used. The polymerization activity was 23,700 g-PP/mmole-Ti, and the entire polymer had an II of 96.0%. The apparent density of the polymer was 0.42 g/ml.

EXAMPLE 28

Preparation of a catalyst component (A)

A decane solution (150 ml) containing 50 millimoles of ethyl butyl magnesium and 17.0 ml of 2-ethylhexanol were reacted at 80° C. for 2 hours to form a uniform solution. Phthalic anhydride (1.11 g; 7.5 millimoles) was added to the solution to form a fully uniform solution. The uniform solution was added a dropwise with stirring over the course of 1 hour to 200 ml of titanium tetrachloride kept at −20° C. Then, the same operation as in Example 1 was performed to give the catalyst component (A).

Polymerization

Propylene was polymerized in the same way as in Example 15 using the resulting catalyst component (A). The results are shown in Table 7.

EXAMPLE 29

Preparation of a catalyst component (A)

Anhydrous magnesium chloride (4.76 g; 50 millimoles), 25 ml of decane, 3.4 ml (10 millimoles) of tetrabutoxytitanium and 17.9 ml (115 millimoles) of 2-ethylhexyl alcohol were reacted at 130° C. for 2 hours to form a uniform solution. Phthalic anhydride (1.11 g; 7.5 millimoles) was added to the solution, and the mixture was stirred at 130° C. for 1 hour to dissolve phthalic anhydride. The resulting uniform solution was cooled to room temperature, and wholly added dropwise over the course of 1 hour to 200 ml (1.8 moles) of titanium tetrachloride kept at −20° C. Then, the same operation as in Example 1 was performed to give the solid titanium catalyst component (A).

Polymerization

Propylene was polymerized in the same way as in Example 15 using the resulting solid titanium catalyst component (A). The results are shown in Table 7.

TABLE 7

| Example | Activity (g-PP/mmole-Ti) | II (%) of the entire polymer | MI | Bulk density (g/ml) |
|---|---|---|---|---|
| 28 | 23,200 | 97.6 | 8.1 | 0.43 |
| 29 | 24,300 | 98.1 | 3.5 | 0.43 |

EXAMPLE 30

Preparation of a solid titanium catalyst component (A)

A solid catalyst component (A) was prepared in the same way as in Example 1 except that 1.43 ml (10 millimoles) of ethyl benzoate was used instead of 1.11 g (7.5 millimoles) of phthalic anhydride. The catalyst component (A) contained 2.4% by weight of titanium.

Polymerization

Propylene was polymerized in the same way as in Example 1 using the resulting solid catalyst component (A). The results are shown in Table 8.

EXAMPLE 31

Preparation of a solid titanium catalyst component (A)

A solid catalyst component (A) was synthesized in the same way as in Example 1 except that 1.80 ml (15.6 millimoles) of benzoyl chloride was used instead of 1.11 g (7.5 millimoles) of phthalic anhydride and 2-ethylhexyl benzoate was formed during the preparation of the catalyst. The resulting solid catalyst component (A) contained 3.1% by weight of titanium.

Polymerization

Propylene was polymerized in the same way as in Example 1 using the resulting solid catalyst component (A). The results are shown in Table 8.

EXAMPLE 32

Preparation of a solid titanium catalyst component (A)

A solid catalyst component (A) was prepared in the same way as in Example 1 except that 1.47 ml (15 millimoles) of methyl acetate was used instead of 1.11 g (7.5 millimoles) of phthalic anhydride. The resulting solid catalyst component (A) contained 4.7% by weight of titanium.

Polymerization

Propylene was polymerized in the same way as in Example 15 using the resulting solid titanium catalyst component (A). The results are shown in Table 8.

EXAMPLE 33

Preparation of a solid titanium catalyst component (A)

A solid catalyst component (a) was prepared in the same way as in Example 1 except that 1.12 ml (15 millimoles) of propionic acid was used instead of 1.11 g (7.5 millimoles) of phthalic anhydride. The resulting solid catalyst component (A) contained 3.1% by weight of titanium.

Polymerization

Propylene was polymerized in the same way as in Example 15 using the solid catalyst component (A). The results are shown in Table 8.

EXAMPLE 34

Preparation of a solid titanium catalyst component (A)

A solid catalyst component (A) was prepared in the same way as in Example 1 except that 1.46 ml (7.5 millimoles) of diphenyl ketone was used instead of 1.11 g (7.5 millimoles) of phthalic anhydride. The resulting solid catalyst component (A) contained 2.5% by weight of titanium.

Polymerization

Propylene was polymerized in the same way as in Example 15 using the resulting solid titanium catalyst component (A). The results are shown in Table 8.

EXAMPLE 35

Preparation of a solid titanium catalyst component (A)

A solid catalyst component (A) was synthesized in the same way as in Example 1 except that 1.82 ml (15 millimoles) of diethyl carbonate was used instead of 1.11 g (7.5 millimoles) of phthalic anhydride. The resulting solid catalyst component (A) contained 4.3% by weight of titanium.

Polymerization

Propylene was polymerized in the same way as in Example 15 using the resulting solid catalyst component (A). The results are shown in Table 8.

EXAMPLE 36

Preparation of a solid titanium catalyst component (A)

A solid catalyst component (A) was prepared in the same way as in Example 1 except that 0.88 ml (7.5 millimoles) of tetramethyl silicate was used instead of 1.11 g (7.5 millimoles) of phthalic anhydride. The resulting solid catalyst component (A) contained 5.1% by weight of titanium.

Polymerization

Propylene was polymerized in the same way as in Example 15 using the resulting solid titanium catalyst component (A). The results are shown in Table 8.

EXAMPLE 37

Preparation of a solid titanium catalyst component (A)

A solid catalyst component (A) was prepared in the same way as in Example 1 except that 0.99 ml (7.5 millimoles) of n-butyl Cellosolve was used instead of 1.11 g (7.5 millimoles) of phthalic anhydride. The resulting solid catalyst component (A) contained 5.5% by weight of titanium.

Polymerization

Propylene was polymerized in the same way as in Example 15 using the resulting solid catalyst component (A). The results are shown in Table 8.

EXAMPLE 38

Preparation of a solid titanium catalyst component (A)

A solid catalyst component (A) was prepared in the same way as in Example 1 except that 4.86 ml (20 millimoles) of 2-ethylhexyl benzoate was used instead of 1.1 g (7.5 millimoles) of phthalic anhydride. The resulting catalyst component (A) contained 3.1% by weight of titanium.

Polymerization

Propylene was polymerized in the same way as in Example 15 using the resulting titanium catalyst component (A). The results are shown in Table 8.

TABLE 8

| Example | Activity (g-PP/mmol-Ti) | II (%) | MI | Bulk density (g/ml) | Particle size distribution (wt %) | | | | | | |
|---|---|---|---|---|---|---|---|---|---|---|---|
| | | | | | >1190μ | >840μ | >420μ | >250μ | >177μ | >105μ | >44μ | 44μ> |
| 30 | 23,200 | 97.6 | 8.1 | 0.43 | 0 | 0 | 0 | 4.7 | 56.8 | 38.2 | 0.3 | 0 |
| 31 | 25,400 | 97.4 | 4.1 | 0.40 | 0 | 0 | 0 | 5.0 | 79.4 | 15.2 | 0.4 | 0 |
| 32 | 17,700 | 97.8 | 2.4 | 0.35 | 0 | 0 | 0.4 | 94.8 | 3.8 | 1.0 | 0 | 0 |
| 33 | 25,100 | 97.3 | 3.1 | 0.43 | 0 | 0 | 0 | 0.3 | 4.4 | 59.7 | 35.6 | 0 |
| 34 | 31,100 | 97.3 | 3.2 | 0.37 | 0 | 0 | 0 | 10.2 | 48.1 | 41.3 | 0.4 | 0 |
| 35 | 16,300 | 98.1 | 1.9 | 0.37 | 0 | 0.2 | 0.8 | 8.9 | 81.3 | 8.6 | 0.2 | 0 |
| 36 | 8,400 | 97.5 | 6.8 | 0.44 | 0 | 0 | 0 | 0.6 | 2.8 | 56.4 | 40.2 | 0 |
| 37 | 17,100 | 96.6 | 1.5 | 0.36 | 0 | 0 | 0.3 | 5.1 | 52.4 | 40.9 | 1.3 | 0 |
| 38 | 22,400 | 97.7 | 5.5 | 0.41 | 0 | 0.3 | 50.9 | 48.5 | 0.3 | 0 | 0 | 0 |

EXAMPLE 39

A 2-liter autoclave was charged with 750 ml of purified hexane, and in an atmosphere of propylene at room temperature, 2.51 millimoles of triethyl aluminum, 0.15 millimole of phenyltriethoxysilane and 0.015 millimole, calculated as the titanium atom, of the catalyst component A described in Example 1 were introduced into the autoclave. After introducing 100 ml of hydrogen, the temperature was raised to 60° C. When the temperature of the polymerization system reached 60° C., a gaseous mixture of propylene and ethylene containing 8.1 mole % of ethylene was fed into the autoclave and maintained under a polymerization pressure of 2 kg/cm$^2$.G for 2 hours. After the polymerization, the slurry containing the resulting polymer was filtered to separate it into a white powdery polymer and a liquid layer. After drying, the amount of the white powdery polymer yielded was 273.2 g. The polymer had an MI of 6.9, and an apparent density of 0.37 g/ml. By measurement of its IR spectrum, the white powdery polymer was found to contain 5.0 mole % of isolated ethylene. It was determined by DSC that the melting point (T$_m$) of this polymer was 135° C. Concentrating the liquid layer afforded 14.8 g of a solvent-soluble polymer. Hence, the activity was 19,200 g-PP/mmole-Ti, and the yield of the polymer was 94.9%.

EXAMPLES 40 TO 47

Preparation of a catalyst component (A)

A catalyst component (A) was prepared in the same way as Example 1 except that 12.5 millimoles of each of the compounds shown in Table 9 was added instead of 2.68 ml of diisobutyl phthalate.

Polymerization

Propylene was polymerized in the same way as in Example 15 except that the catalyst component (A) prepared as above was used. The results are shown in Table 9.

TABLE 9

| Example | Polycarboxylic acid ester | Activity (g-PP/mmole-Ti) | II (%) | MI | Bulk density |
|---|---|---|---|---|---|
| 40 | Di-n-pentyl phthalate | 25,900 | 96.4 | 3.1 | 0.43 |
| 41 | Monoethyl phthalate | 19,600 | 93.1 | 10.1 | 0.42 |
| 42 | Diphenyl phthalate | 23,900 | 95.1 | 2.9 | 0.42 |
| 43 | Di-2-ethylhexyl phthalate | 24,200 | 96.1 | 8.5 | 0.42 |
| 44 | Diethyl phenylmalonate | 20,700 | 92.9 | 3.9 | 0.41 |
| 45 | Di-2-ethylhexyl maleate | 19,500 | 95.1 | 4.8 | 0.41 |
| 46 | Diethyl 1,2-cyclohexanedicarboxylate | 23,400 | 93.1 | 12.1 | 0.40 |
| 47 | 1,2-Diacetoxybenzene | 21,300 | 92.8 | 5.4 | 0.41 |

EXAMPLE 48

Preparation of a catalyst component (A)

Fifty millimoles of a solid substance formed by the reaction of butyl magnesium chloride with silicon tetrachloride, 25 ml of decane and 23.4 ml of 2-ethylhexyl alcohol were heated at 130° C. for 2 hours to form a uniform solution. Then, 1.11 g of phthalic anhydride was added and reacted at the same temperature for 1 hour to form a uniform solution. The solution was worked up in the same way as in Example 1 to give a catalyst component (A).

Polymerization

Propylene was polymerized in the same way as in Example 15 except that the catalyst component (A) prepared as above was used. The results are shown in Table 10.

EXAMPLE 49

Preparation of a catalyst component (A)

Diethoxy magnesium (5.73 g), 23.4 ml of 2-ethylhexyl alcohol and 50 ml of decane were reacted at 130° C. for 3 hours in the presence of hydrogen chloride. Phthalic anhydride (1.11 g) was added to the resulting uniform solution, and reacted further at the same temperature for 1 hour. The resulting uniform solution was worked up in the same way as in Example 1 to form a catalyst component (A).

Polymerization

Propylene was polymerized in the same way as in Example 15 except that the catalyst component (A) prepared as above was used. The results are shown in Table 10.

TABLE 10

| Example | Magnesium compound | Activity (g-PP/mmole-Ti) | II (%) | MI | Bulk density |
|---|---|---|---|---|---|
| 48 | C$_4$H$_9$MgCl | 21,300 | 94.9 | 2.9 | 0.41 |
| 49 | Diethoxy magnesium | 18,100 | 95.1 | 8.3 | 0.42 |

EXAMPLES 50 AND 51

Preparation of a catalyst component (A)

A catalyst component (A) was prepared in the same way as in Example 1 except that each of the compounds shown in Table 11 was used instead of 2-ethylhexyl alcohol.

Polymerization

Propylene was polymerized in the same way as in Example 15 except that the catalyst component (A) prepared as above was used. The results are shown in Table 11.

TABLE 11

| Example | Compound | Activity (g-PP/mmole-Ti) | II (%) | MI | Bulk density |
|---|---|---|---|---|---|
| 50 | Oleyl alcohol | 19,300 | 96.1 | 5.4 | 0.43 |
| 51 | n-Butyl | 24,100 | 94.8 | 10.2 | 0.42 |

EXAMPLE 52

A 2-liter autoclave was charged with 1000 ml of purified hexane, and then 1.0 millimole of triisobutyl aluminum, 0.05 millimole of phenyltriethoxysilane and 0.02 millimole, calculated as the titanium atom, of the catalyst component (A) prepared in Example 1 were introduced into the autoclave. The autoclave was maintained in a closed system, and then the temperature was raised to 80° C. At 80° C., the pressure was raised to 3 kg/cm$^2$—G with hydrogen, and ethylene was further introduced to adjust the total pressure to 8 kg/cm$^2$—G. The temperature was maintained at 90° C. for 2 hours. In 2 hours after the introduction of ethylene, the ethylene introduction was stopped, the the autoclave was quickly cooled.

After the polymerization, the slurry containing the resulting polymer was filtered, and a white powdery polymer was collected. The amount yielded of the white powdery polymer after drying was 316 g. It had an apparent density of 0.39 g/ml and an MI of 5.1. Its particle size distribution was very good as shown in Table 12. The molecular weight distribution of the white powdery polymer was measured by gel permeation chromatography, and it was found that Mw/Mn was 3.9.

TABLE 12

| >1190 μ | >840 μ | >420 μ | >250 μ | >177 μ | >105 μ | >44 μ | 44 μ> |
|---|---|---|---|---|---|---|---|
| 0 | 0.3 | 6.8 | 90.5 | 2.3 | 0.1 | 0 | 0 |

EXAMPLE 53

A 2-liter autoclave purged with nitrogen was charged with 1000 ml of 4-methylpentene-1, 1.0 millimole of triethyl aluminum, 0.7 millimole of diphenyldimethoxysilane and 0.02 millimole, calculated as the titanium atom, of the catalyst component (A) prepared in Example 1, and then the catalyst feed opening of the autoclave was closed. Hydrogen (50 ml) was introduced. The contents in the autoclave were heated to 60° C., and then maintained at this temperature for 2 hours. After the lapse of 2 hours, the autoclave was quickly cooled.

After the polymerization, the slurry containing the resulting polymer was filtered and separated into a white powdery polymer and a liquid phase. The amount yielded of the white powdery polymer after drying was 213.2 g. This polymer had an apparent density of 0.31 g/ml and an intrinsic viscosity [η] of 5.5. Concentrating the liquid phase gave 3.1 g of a solvent-soluble polymer. Accordingly, the activity was 10,800 g of polymer/millimole-Ti, and the yield of polymer was 98.6% by weight.

EXAMPLE 54

A 2-liter autoclave purged with nitrogen was charged with 1 liter (580 g) of purified butene-1, and at 0° C., 1.0 mmole of triethyl aluminum, 0.7 millimole of diphenyldimethoxysilane, and 0.02 millimole, calculated as the titanium atom, of the catalyst component (A) prepared in Example 1 were introduced into the autoclave. The catalyst feed opening of the autoclave was closed. Hydrogen (300 ml) was a introduced. The contents of the autoclave were heated to 35° C., and maintained at this temperature for 2 hours. After the lapse of 2 hours, 10 ml of methanol was added to stop the polymerization. The unreacted butene-1 was purged out of the autoclave. The resulting white powdery polymer was dried, and its amount was measured. It was 263 g. The polymer had a boiling n-heptane extraction residue of 96.5%.

What we claim is:

1. A process for producing olefin polymers or copolymers which comprises polymerizing olefins having 2 to 10 carbon atoms or copolymerizing said olefins with each other or with up to 10 mole % of dienes at a temperature of about 20° to about 200° C. and at a pressure of from atmospheric pressure to about 100 kg/cm$^2$, in the presence of a catalyst composed of the following components (A), (B), and (C);

(A) a solid titanium catalyst component containing magnesium, titanium, halogen and an ester of polycarboxylic acids, said catalyst component being obtained by (1) contacting a liquid hydrocarbon solution of (i) a magnesium compound having no reducing ability, the hydrocarbon solution being obtained by mixing the magnesium compound and the hydrocarbon with or without heating the mixture, or by mixing a magnesium compound and the hydrocarbon in the presence of an alcohol with or without heating the mixture, with (ii) a tetravalent titanium compound of the formula Ti(OR)$_g$X$_{4-g}$ wherein R represents a hydrocarbon group, X represents a halogen atom and g is a number represented by 0≦g≦4 in the liquid state to form a solid product or (2) first preparing a liquid hydrocarbon solution of the magnesium compound (i) and the titanium compound (ii) and then forming a solid product therefrom, by adding an additional amount of the titanium compound (ii) or a precipitating agent selected from the group consisting of halogens, halogenated hydrocarbons, halogen-containing silicon compounds, halogen-containing aluminum compounds, halogen-containing lithium compounds, halogen-containing sulfur compounds and halogen-containing antimony compounds, said reaction of forming the solid product being carried out in the presence of (D) at least one electron donor selected form the group consisting of C$_2$–C$_{20}$ monocarboxylic acid esters, C$_1$–C$_{20}$ aliphatic carboxylic acids, C$_4$–C$_{20}$ carboxylic acid anhydrides, C$_3$–C$_{20}$ ketones, C$_3$–C$_{20}$ aliphatic carbonates, C$_3$–C$_{20}$ alkoxy group-containing alcohols and organic silicon compounds having an Si—O—C bond in which the organic group has 1 to 10 carbon atoms, and during or after the formation of the solid product, contacting the solid product with (E) an ester of polycarboxylic acid selected from the group consisting of $C_5$–$C_{30}$ aliphatic polycarboxylic acid esters, $C_{10}$–$C_{30}$ alicyclic polycarboxylic acid esters, $C_{10}$–$C_{30}$ aromatic polycarboxylic acid esters and $C_8$–$C_{30}$ heterocyclic polycarboxylic acid esters, wherein the amount of said at least one electron donor (D) is about 0.05 to about 0.5 mole per mole of magnesium compound (i) and the amount of said ester of polycarboxylic acid (E) is about 0.1 to about 0.5 mole per mole of magnesium compound (i), (B) an organoaluminum compound catalyst component, and (C) an organic silicon compound catalyst component having an Si—O—C bond.

2. The process of claim 1 wherein the organic silicon compound (C) is a compound of the formula $$R_nSi(OR^1)_{4-n}$$

wherein R represents a member selected from the class consisting of $C_1$–$C_{10}$ alkyl groups, $C_5$–$C_{12}$ cycloalkyl groups, $C_6$–$C_{20}$ aryl groups, $C_1$–$C_{10}$ alkenyl groups, $C_1$–$C_{10}$ haloalkyl groups and $C_1$–$C_{10}$ amino alkyl groups, $R^1$ represents a member selected from the class consisting of $C_1$–$C_{10}$ alkyl groups, $C_5$–$C_{12}$ cycloalkyl groups, $C_6$–$C_{20}$ aryl groups, $C_1$–$C_{10}$ alkenyl groups and $C_2$–$C_{16}$ alkoxyalkyl groups, n is a number represented by $0 \leq n \leq 3$, and nR groups or $(4-n)OR^1$ groups may be identical or different.

3. The process of claim 1 wherein the polymerization is carried out under such quantitative conditions that per liter of the liquid reaction medium in the case of liquid-phase reaction or per liter of the volume of the reaction zone in the case of vapor-phase reaction, component (A) is used in an amount of 0.0001 to 1 millimole calculated as the titanium compound; compound (B), in an amount of 1 to 2,000 moles as the metal atom therein per mole of the titanium atom in the component (A); and component (C), in the amount of 0.001 to 10 moles as the silicon compound therein per mole of the metal atom in component (B).

4. The process of claim 1 wherein the solid titanium catalyst component (A) is obtained by contacting a liquid hydrocarbon solution of (i) anhydrous magnesium chloride in the presence of 2-ethylhexyl alcohol and phthalic anhydride with (ii) titanium tetrachloride in the liquid state, adding diisobutylphthalate to the resulting mixture, collecting the solid portion from the resulting reaction mixture, and suspending the solid portion in liquid titanium tetrachloride and recovering the solid titanium catalyst component.

5. The process of claim 3 for producing olefin polymers from $C_3$–$C_{10}$ olefins or copolymers from $C_3$–$C_{10}$ olefins and up to 10 mole % of ethylene or a diene or mixtures thereof at a temperature of about 50° to about 180° and a pressure of from about 2 kg/cm² to about 50 km/cm².

6. The process of claim 1 wherein the molar ratio of the ester (E) to the electron donor (D) is from about 1:0.01 to 1:2.

7. The process of claim 1 wherein the molar ratio of the ester (E) to the electron donor (D) is from about 1:0.1 to 1:1.

8. A process for polymerizing propylene which comprises polymerizing propylene at a temperature of from about 20° to about 200° C. and at a pressure of from atmospheric pressure to about 100 kg/cm², in the presence of a catalyst composed of the following components (A), (B) and (C);

(A) a solid titanium catalyst component containing magnesium, titanium, halogen and an ester of a polycarboxylic acid, said catalyst component being obtained by contacting a liquid hydrocarbon solution of (i) anhydrous magnesium chloride in the presence of 2-ethylhexyl alcohol and phthalic anhydride with (ii) titanium tetrachloride in the liquid state, adding diisobutylphthalate to the resulting mixture, collecting the solid portion from the resulting reaction mixture, and suspending the solid portion in liquid titanium tetrachloride and recovering the solid titanium catalyst component;

(B) triethylaluminum; and (C) phenyltriethoxy silane, diphenyldimethoxy silane, phenyltrimethoxy silane, vinyltrimethoxy silane, methyltrimethoxy silane, tetraethoxy silane, ethyltriethoxy silane, vinyltriethoxy silane, or methylphenyldimethoxy silane.

9. A process for producing olefin polymers or copolymers by polymerizing or copolymerizing an olefin selected from the group consisting of ethylene, propylene, 4-methylpentene-1 and butene-1 at a temperature of about 50° to 180° C. and at a pressure of from about 2 to about 50 kg/cm², in the presence of a catalyst composed of the following components (A), (B) and (C);

(A) a solid titanium catalyst component containing magnesium, titanium, halogen, and an ester of polycarboxylic acid, said catalyst component being obtained by contacting a liquid hydrocarbon solution of (i), a magnesium compound selected from the group consisting of anhydrous magnesium chloride, ethoxy magnesium chloride, ethyl butyl magnesium, butyl magnesium chloride and diethoxy magnesium in the presence of an alcohol having at least 6 carbon atoms with (ii) titanium tetrachloride to form a solid product, wherein the solid product is formed in the presence of (D) an electron donor selected from the group consisting of phthalic anhydride, ethyl benzoate, benzoyl chloride, methyl acetate, propionic acid, diphenyl ketone, diethyl carbonate, tetramethyl silicate, n-butyl Cellosolve, and 2-ethylhexyl benzoate in an amount of about 0.05 to 0.5 mole, per mole of the magnesium compound (i), and during or after the formation of the solid product, contacting the solid product with (E) from about 0.1 to about 0.5 mole, per mole of the magnesium compound (i) of an ester of a polycarboxylic acid selected from the group consisting of diisobutyl phthalate, di-n-butyl phthalate, diethyl phthalate, diisopropyl phthalate, di-n-pentyl phthalate, monoethyl phthalate, phenyl phthalate, di-2-ethylhexyl phthalate, diethyl phenyl malonate, di-2-ethylhexyl maleate, diethyl 1,2-cyclohexane dicarboxylate and 1,2-diacetoxybenzene;

(B) triethyl aluminum; and (C) an organic silicon compound selected from the group consisting of phenyltriethoxy silane, diphenyldimethoxy silane, phenyltrimethoxy silane, vinyltrimethoxy silane, methyltrimethoxy silane, tetraethoxy silane, ethyltriethoxy silane, vinyltriethoxy silane, or methylphenyldimethoxy silane.

10. A solid titanium catalyst component containing magnesium, titanium, halogen and an ester of polycarboxylic acid which is useful in the polymerization of olefins or the copolymerization of olefins with each other or with dienes, said catalyst component being obtained by (1) contacting a liquid hydrocarbon solution of (i) a magnesium compound having no reducing ability, the hydrocarbon solution being obtained by mixing the magnesium compound and the hydrocarbon with or without heating the mixture, or by mixing a magnesium compound and the hydrocarbon in the presence of an alcohol with or without heating the mixture, with (ii) a tetravalent titanium compound of the formula $Ti(OR)_g X_{4-g}$ wherein R represents a hydrocarbon group, X represents a halogen atom and g is a number represented by $0 \leq g \leq 4$, in the liquid state to form a solid product or (2) first preparing a liquid hydrocarbon solution of the magnesium compound (i) and the titanium compound (ii) and then forming a solid product therefrom, by adding an additional amount of the titanium compound (ii) or a precipitating agent selected from the group consisting of halogens, halogenated hydrocarbons, halogen-containing silicon compounds, halogen-containing aluminum compounds, halogen-containing lithium compounds, halogen-containing sulfur compounds and halogen-containing antimony compounds, said reaction of forming the solid product being carried out in the presence of (D) at least one electron donor selected from the group consisting of $C_2$–$C_{20}$ monocarboxylic acid esters, $C_1$–$C_{20}$ aliphatic carboxylic acids, $C_4$–$C_{20}$ carboxylic acid anhydrides, $C_3$–$C_{20}$ ketones, $C_3$–$C_{20}$ aliphatic carbonates, $C_3$–$C_{20}$ alkoxy group-containing alcohols and organic silicon compounds having an Si—O—C bond in which the organic group has 1 to 10 carbon atoms and during or after the formation of the solid product, contacting the solid product with (E) an ester of polycarboxylic acid selected from the group consisting of $C_5$–$C_{30}$ aliphatic polycarboxylic acid esters, $C_{10}$–$C_{30}$ alicyclic polycarboxylic acid esters, $C_{10}$–$C_{30}$ aromatic polycarboxylic acid esters and $C_8$–$C_{30}$ heterocyclic polycarboxylic acid esters, wherein the amount of said at least one electron donor (D) is about 0.05 to about 0.5 mole per mole of magnesium compound (i) and the amount of said ester of polycarboxylic acid (E) is about 0.1 to about 0.5 mole per mole of magnesium compound (i).

11. The titanium catalyst component of claim 10 in combination with
(B) an organometallic compound of a metal selected from the group consisitng of metals of Groups I to III of the periodic table, and
(C) an organic silicon compound having Si—O—C bond.

12. The titanium catalyst component of claim 10 wherein the magnesium/titanium atomic ratio is from about 2 to about 100, the halogen/titanium atomic ratio is from about 4 to about 100, and the electron donor/titanium molar ratio is from about 0.01 to 100.

13. The combination catalyst composition of claim 11 wherein the organic silicon catalyst component comprises a compound of the formula $R_n Si (OR^1)_{4-n}$ wherein R represents a member selected from the class consisting of $C_1$–$C_{10}$ alkyl groups, $C_5$–$C_{12}$ cycloalkyl groups, $C_6$–$C_{20}$ aryl groups, $C_1$–$C_{10}$ alkenyl groups, $C_1$–$C_{10}$ haloalkyl groups and $C_1$–$C_{10}$ amino groups, $R^1$ represents a member selected from the class consisting of $C_1$–$C_{10}$ alkyl groups, $C_5$–$C_{12}$ cycloalkyl groups, $C_6$–$C_{20}$ aryl groups, $C_1$–$C_{10}$ alkenyl groups and $C_2$–$C_{16}$ alkoxyalkyl groups, n is a number represented by $0 \leq n \leq 3$, and nR groups or $(4-n)OR^1$ groups may be identical or different.

14. The combination catalyst composition of claim 11 wherein the solid titanium catalyst component (A) is obtained by contacting a liquid hydrocarbon solution of (i) anhydrous magnesium chloride in the presence of 2-ethylhexyl alcohol and phthalic anhydride with (ii) titanium tetrachloride in the liquid state, adding diisobutylphthalate to the resulting mixture, collecting the solid portion from the resulting reaction mixture, and suspending the solid portion in liquid titanium tetrachloride and recovering the solid titanium catalyst component.

15. The combination catalyst composition of claim 11 wherein the solid titanium catalyst component is obtained by contacting a liquid hydrocarbon solution of (i), a magnesium compound selected from the group consisting of anhydrous magnesium chloride, ethoxy magnesium chloride, ethyl butyl magnesium, butyl magnesium chloride and diethoxy magnesium in the presence of an alcohol having at least 6 carbon atoms with (ii) titanium tetrachloride to form a solid product, wherein the solid product is formed in the presence of (D) an electron donor selected from the group consisting of phthalic anhydride, ethyl benzoate, benzoyl chloride, methyl acetate, propionic acid, diphenyl ketone, diethyl carbonate, tetramethyl silicate, n-butyl Cellosolve, and 2-ethylhexyl benzoate in an amount of about 0.05 to 0.5 mole, per mole of the magnesium compound (i), and during or after the formation of the solid product, contacting the solid product with (E) from about 0.1 to about 0.5 mole, per mole of the magnesium compound (i) of an ester of a polycarboxylic acid selected from the group consisting of diisobutyl phthalate, di-n-butyl phthalate, diethyl phthalate, diisopropyl phthalate, di-n-pentyl phthalate, monoethyl phthalate, phenyl phthalate, di-2-ethylhexyl phthalate, diethyl phenyl malonate, di-2-ethylhexyl maleate, diethyl 1,2-cyclohexane dicarboxylate and 1,2-diacetoxybenzene;
the organometallic compound is triethyl aluminum; and
the organic silicon compound is pheyltriethyoxy silane, diphenyldimethoxy silane, phenyltrimethoxy silane, vinyltrimethoxy silane, methyltrimethoxy silane, tetraethoxy silane, ethyltriethoxy silane, vinyltriethoxy silane, or methylphenyldimethoxy silane.

16. The combination catalyst composition of claim 11 which comprises:
(A) a solid titanium catalyst component containing magnesium, titanium, halogen and an ester of a polycarboxylic acid, said catalyst component being obtained by contacting a liquid hydrocarbon solution of (i) anhydrous magnesium chloride in the presence of 2-ethylhexyl alcohol and phthalic anhydride with (ii) titanium tetrachloride in the liquid state, adding diisobutylphthalate to the resulting mixture, collecting the solid portion from the resulting reaction mixture, and suspending the solid portion in liquid titanium tetrachloride and recovering the solid titanium catalyst component;
(B) triethylaluminum; and
(C) phenyltriethoxy silane, diphenyldimethoxy silane, phenyltrimethoxy silane, vinyltrimethoxy silane, methyltrimethoxy silane, tetraethoxy silane, ethyltriethoxy silane, vinyltriethoxy silane, or methylphenyldimethoxy silane.

17. The titanium catalyst component of claim 10 wherein the molar ratio of the ester (E) to the electron donor (D) is from about 1:0.01 to 1:2.

18. The combination catalyst composition of claim 11 wherein the molar ratio of the ester (E) to the electron donor (D) is from about 1:0.01 to 1:2.

* * * * *